United States Patent [19]

Heath

[11] Patent Number: 4,461,440
[45] Date of Patent: Jul. 24, 1984

[54] PIPE HANGER FOR COMPOSITE PIPE HANGER NUT

[75] Inventor: Richard W. Heath, La Habra, Calif.

[73] Assignee: Tolco Incorporated, Brea, Calif.

[21] Appl. No.: 468,074

[22] Filed: Feb. 22, 1983

Related U.S. Application Data

[63] Continuation-in-part of Ser. No. 374,179, May 3, 1982.

[51] Int. Cl.³ .............................................. E21F 17/02
[52] U.S. Cl. ........................................ 248/59; 248/62
[58] Field of Search ................... 248/59, 60, 58, 62, 248/63; 411/427, 902, 129, 130

[56] References Cited

U.S. PATENT DOCUMENTS

| | | | |
|---|---|---|---|
| 993,510 | 5/1911 | Cowles | 248/59 X |
| 1,698,571 | 1/1929 | Van Cleve | 248/62 |
| 1,929,700 | 10/1933 | Malone | 248/58 X |
| 3,261,580 | 7/1966 | Schauster | 248/62 |
| 4,305,557 | 12/1981 | Kowalski | 248/59 X |

Primary Examiner—J. Franklin Foss
Attorney, Agent, or Firm—Knobbe, Martens, Olson & Bear

[57] ABSTRACT

A pipe hanger strap assembly is formed having two overlapping segments with coaxial holes to accommodate the passage of a composite hanger ring nut and a pipe hanger rod. The ring nut is a composite of a tubular plastic element having a radially extending flange on one end with a metal nut embedded in the flange. A flange on one end of the overlapping segment of the pipe hanger assembly is spring-loaded against the ring nut flange by virtue of the spring constant of the formed pipe hanger assembly. This spring loaded flange contact inhibits unintentional loosening of the composite ring nut and, in the event that the plastic ring nut flange disintegrates, the flange on the overlapping segment contacts the metal nut to prevent inadvertent loosening of that nut.

7 Claims, 7 Drawing Figures

U.S. Patent  Jul. 24, 1984  Sheet 1 of 2  4,461,440
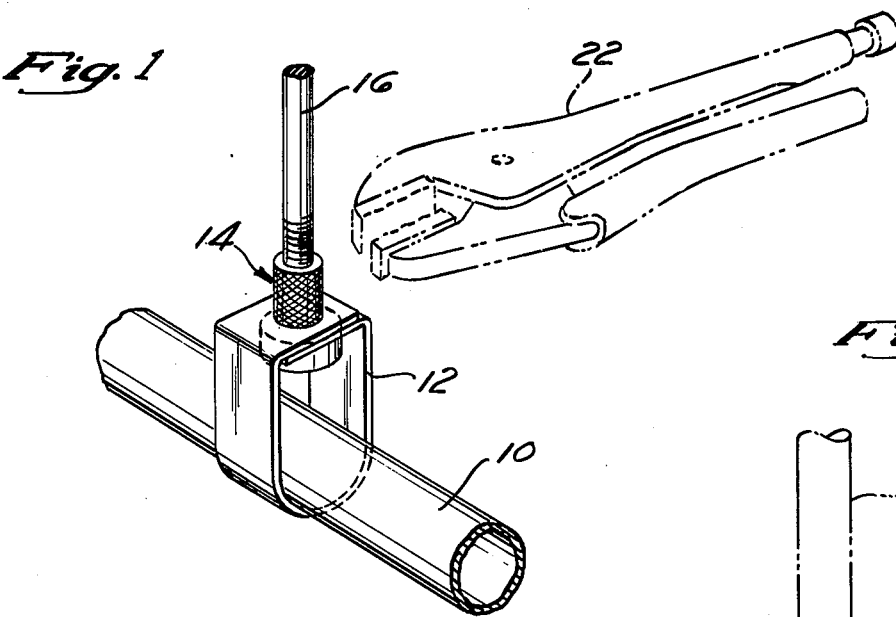
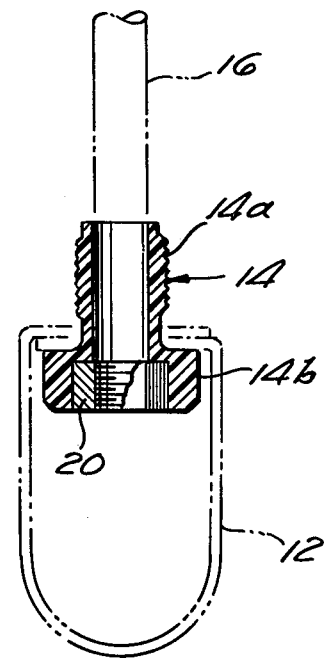
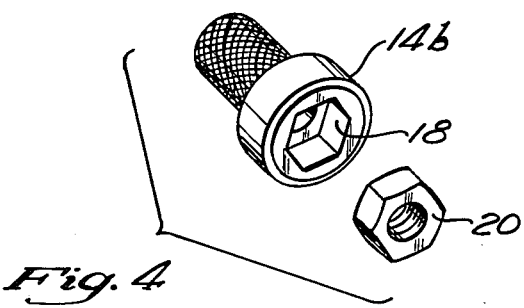
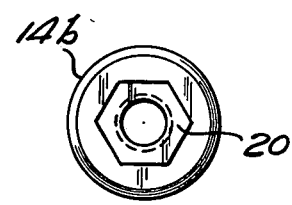

PIPE HANGER FOR COMPOSITE PIPE HANGER NUT

BACKGROUND OF THE INVENTION

This invention relates to an improved device for retaining an adjustable ring nut for supporting pipe hangers and is a continuation-in-part of United States patent application Ser. No. 374,179, filed on May 3, 1982.

Pipe hanger assemblies typically include a pipe hanger strap or other such member which surrounds and supports the pipe or other object to be suspended from an overhead support. The pipe hanger strap often is made by bending or forming a metal strap into a loop through which the pipe passes. The two ends of the strap overlap and are pinned together by a pipe hanger rod extending through holes in the strap ends. The pipe hanger rod is connected on its upper end to a ceiling beam or other overhead supporting structure, and the lower end of the rod is connected to the overlapping portions of the pipe hanger strap. One common way of adjustably connecting the lower end of the rod to the pipe hanger strap is to use a steel ring nut which has a tubular exterior with an outwardly extending flange at its lower end and has a threaded interior. The upper end of the ring nut extends through the holes in the overlapping portions of the pipe hanger strap but the flange on the lower end is larger than the holes in the strap. Thus, when the nut is threaded onto the lower end of the pipe hanger rod, the flange supports the pipe hanger strap. Gaining access to the flange for rotating the ring nut in adjusting its position on the support rod is difficult. Thus the exterior of the upper tubular portion is usually knurled or otherwise formed to facilitate gripping so that the ring nut can be turned from above the pipe hanger strap.

An inexpensive approach which allows easy adjustment capability is described in U.S. patent application Ser. No. 374,179 filed on May 3, 1982, wherein a plastic element extends through the holes in the overlapping portions of the straps to allow for easy access adjustment. The plastic element has a flange with a recess in which a standard metal nut is placed. The nut is screwed onto the pipe hanger rod but captured by the plastic element; thus the pipe hanger strap is adjustably supported by the rod with the load being borne by the nut.

The plastic element is quite durable but in the very unlikely event it should disintegrate, as in a fire or over a prolonged period of time, the nut will still hold the strap and pipes onto the pipe hanger rod. There is, however, a possibility that the nut will, in time, unscrew or jiggle loose, especially if the plastic element disintegrates and falls away.

Accordingly, the need exists for a method of adjustably connecting the pipe hanger strap and the pipe hanger rod in a manner that is not only convenient and relatively inexpensive, but which will insure the integrity of the connection after exposure to environmental extremes such as heat caused by a fire.

Another approach that is also used in pipe hanger assemblies is to simply insert the pipe hanger rod through the opening in the pipe hanger strap and thread a regular nut onto the lower end of the rod. The exterior dimension of the nut is greater than the hole in the strap so that the load is transmitted directly to the nut. This approach still has the shortcoming of allowing the nut to jiggle loose and unscrew.

Accordingly, the need exists for a method of connecting the pipe hanger strap and the pipe hanger rod by using a regular metal nut, yet insuring the nut does not unscrew or otherwise jiggle loose.

SUMMARY OF THE INVENTION

Briefly stated, this pipe hanger invention is a safety retention device formed by taking a metal strip, bending or forming one end of the strip to form a flange, bending or forming the strip so that the two ends overlap to form a loop to support pipes or other objects, with the flange being located on the inside of the loop. The overlapping segments have holes or slots therethrough which can substantially coincide to allow the insertion of a composite ring nut which has a tubular element extending through said holes, and a flange on one end extending radially outwards which is sized so as to prevent passage through the holes in the overlapping segments. A pipe hanger rod passes through the tubular element and engages a nut captured by the flange of the composite ring nut.

The pipe hanger assembly is made so that the metal strip constitutes a spring which tends to force the overlapping ends of the strip apart thereby making the holes in the overlapping segments non-coaxial. This spring effect forces the flange on the overlapping segment into contact with the flange on the composite ring nut when the nut is inserted through the holes in the overlapping segment. If a regular nut is used, the spring effect forces the flange into contact with the regular nut.

The advantage of the spring effect is that the flange is spring-loaded against the composite ring nut or regular nut, thereby inhibiting unintentional loosening of either nut. Additionally, if the plastic or other nonmetallic material used in the composite ring nut should disintegrate as in a fire, then the flange on the overlapping segment of the pipe hanger assembly will be spring-loaded against the metallic nut previously encased by the composite material that had disintegrated. There is thus provided an inexpensive safety retention device of relatively simple manufacture, which will allow easy adjustment of the pipe hanger assembly and yet insure integrity of the connection to the pipe hanger support rod under such adverse conditions as fire.

DESCRIPTION OF THE DRAWINGS

FIG. 1 is a perspective view of a pipe hanger assembly utilizing the composite ring nut of the invention;

FIG. 2 is a cross-sectional view of the ring nut with a pipe hanger and pipe hanger support rod shown in phantom lines;

FIG. 3 is an end view of the nut; and

FIG. 4 is an exploded perspective view of the nut;

DETAILED DESCRIPTION OF THE PREFERRED EMBODIMENT

Figure 6:
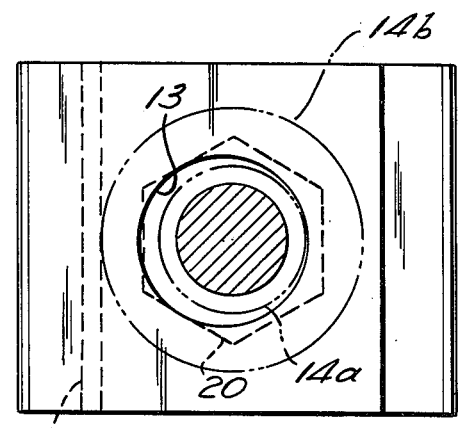
FIG. 6 is a view taken along line 6—6 of FIG. 5.

Referring to FIG. 1, a pipe 10 is shown extending through a conventional pipe hanger strap 12. A composite pipe hanger nut 14 extends through holes through overlapping upper ends of the pipe hanger strap, and a pipe hanger rod 16 is connected to the nut.

As seen from FIG. 1 as well as the other figures, the composite ring nut 14 includes an upper tubular portion 14a which extends through the holes in the pipe hanger strap ends and a lower, outwardly extending flange 14b which engages the surface of the pipe hanger strap end surrounding the hole through which the tubular portion extends. The flange 14b has a recess formed in its lower axial face in which is positioned a conventional nut 20 having a hexagonal, or other straight-sided exterior which fits snugly within the recess. The straight-sided arrangement or other interconnection is necessary so that rotation of the tubular element will rotate the nut. The nut is preferably made of steel and the tubular element is preferably made of a relatively strong, moldable, plastic-like material.

In use, the composite ring nut is positioned through the pipe hanger strap as shown in FIGS. 1 and 2, and the nut 20 is threaded onto the lower end of the pipe hanger rod 16. Since the threads are formed in the steel nut, the weight of the pipe or other load on the pipe hanger strap is borne by the steel thread on the nut 20 rather than the plastic element. The plastic element may be separately molded and the nut then pressed into the recess, or the plastic element may be molded around the nut.

Figure 5:
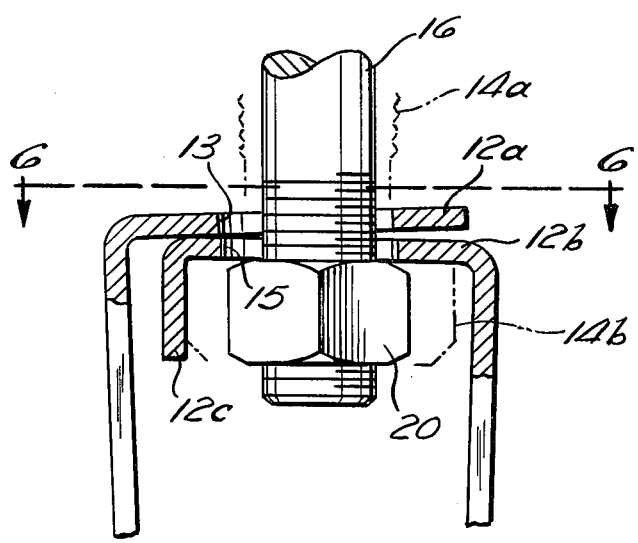
FIG. 5 is a partial sectional view of the improved hanger showing a flange on the overlapping hanger segment spring-loaded against the flange of the composite ring nut.

Referring to FIG. 5, there is shown a modified hanger having the nut retention feature of the invention. The plastic portion of a composite nut 14 is shown in phantom extending through the holes 13 and 15 in the overlapping segments 12a and 12b of the pipe hanger strap 12. The lower segment 12b has on its end a downwardly extending flange 12c engaging the side of the flange 14b of the composite ring nut while the flange 12c on the lower segment 12b is spring-loaded into contact with the flange 14b of the composite ring nut 14. The pipe hanger strap 12 is made so that the holes or slots through the overlapping segments 12a and 12b do not naturally align but are spring-loaded apart by the pipe hanger strap 12 which acts as a leaf spring. With that arrangement, the edge 13 of the hole 13 in the upper segment 12a is spring-loaded into contact with the adjacent surface of the upper tubular portion 14a of the composite pipe hanger nut 14. Note from FIG. 6 that the holes 13 and 15 are sufficiently oversized to accommodate the composite nut but yet are small enough that the steel nut 20 extends beyond the holes so that the load of the hanger is borne by the steel nut.

The spring contact between the overlapping segments 12a and 12b with the tubular element of composite ring nut 14, and the contact between the flange 12c and the flange 14b is not so strong as to prevent easy adjustment of the composite ring nut 14. This spring-loaded contact helps prevent inadvertent loosening of the composite ring nut 14 after the nut has been properly adjusted, although the frictional engagement between the other portions of the nut and the hanger segments also contribute to this.

Figure 7:
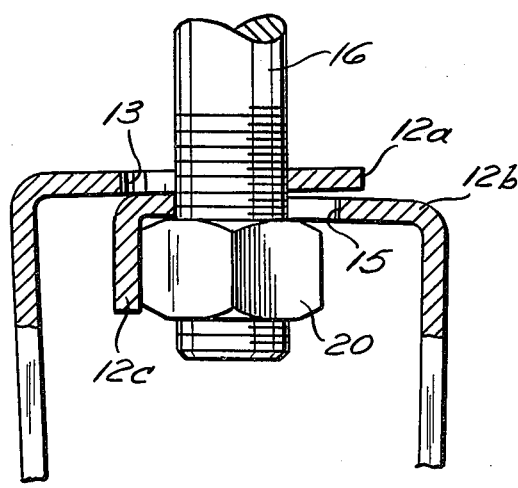
FIG. 7 is a partial sectional view of the hanger of FIG. 5 showing the flange on the overlapping segment of the spring-loaded pipe hanger assembly contacting a metal nut with no plastic component of a composite ring nut.

If the plastic-like material on the composite ring nut 14 disintegrates, as in a fire, the flange 12c is urged by the springiness of the hanger against the metallic nut 20 as shown in FIG. 7, and prevent that nut from inadvertently loosening. This spring-loaded contact thus insures the integrity of the connection between the pipe hanger strap 12 and the pipe hanger rod 16. The hole or slot 15 on the overlapping segment 12b is of sufficient dimension to allow the flange 12c to move from the position of FIG. 5 against the flange 14b to the position of FIG. 7 against the metallic nut 20. Thus, the hole 15, in the direction of travel that the segment 12b can move, must be at least as large as the diameter of the bolt 16 plus the wall thickness of the plastic nut portion 14a plus the thickness of the flange 14b material between the nut 20 and the flange 12.

FIG. 7 also illustrates the situation wherein the pipe hanger assembly 12 is initially only held onto the pipe hanger rod 16 by a regular nut 20, the nut being larger than the holes or slots 13 and 15 through the pipe hanger straps 12a and 12b so that the load is transmitted directly to the nut. The flange 12c on the overlapping end 12b is spring loaded into contact with the nut 20 in order to prevent inadvertent loosening of the nut, yet the sides of the hanger may be urged towards each other so they do not prevent easy adjustment of the nut.

The flange 12c on the overlapping segment of the pipe hanger strap 12 is shown in FIG. 6 as extending for the entire width of the strap 14. The overhanging segment 12c need not necessarily extend the entire width of the strap 14, but the overhang is easier to manufacture if it does extend the entire width of the strap.

I claim:

1. A pipe hanger comprising:
  a lower pipe hanger portion for supporting a pipe;
  upper, overlapping end portions on said pipe hanger each having a hole therethrough for passage of a pipe hanger rod;
  and
  a downwardly extending flange on one overlapping end portion having a flat surface for engaging a flat side of a retention nut to be connected to the lower end of said pipe hanger rod to prevent inadvertent loosening of the nut, wherein said hanger portion includes means horizontally urging said flange against said nut and wherein said holes in the upper overlapping portions of the pipe hanger are misaligned when the hanger is unrestrained but said pipe hanger lower portion is resilient such that the holes may be manually aligned to permit insertion of the rod and the resiliency provides the means for horizontally urging the flange against the nut.

2. An apparatus for supporting pipes and other objects, comprising:
  a strap having a lower portion for supporting an object;
  first and second overlapping end portions on said strap each having a hole therethrough for the insertion of a pipe hanger rod;
  fastening means for connecting said strap to said pipe hanger rod including means larger than said holes positioned beneath said strap end portions for supporting the weight of said object and the strap;
  a depending flange on said first overlapping end portion;
  resilient means on the lower portion of said strap which produces a horizontal force urging said flange against the side of said fastening means positioned beneath the strap end portions in order to inhibit inadvertent loosening of the connection of said fastening means to the rod.

3. The apparatus of claim 2 wherein said fastening means comprises:

a composite ring nut including a metallic nut threaded onto said pipe hanger rod and a radially extending flange made of plastic-like material which captures said metallic nut, and a tubular portion of plastic-like material extending through said holes in said overlapping end portions to provide for easy access adjustment of said metallic nut.

4. The apparatus of claim 3 wherein the dimensions of the hole in said first overlapping end portion and the location of said flange on the same overlapping end portion permit said flange to be urged against said metallic nut by said resilient means in the event said plastic-like flange disintegrates and thereby inhibit inadvertent loosening of said metallic nut.

5. The apparatus of claim 4 wherein said first overlapping end portion is adjacent to said plastic-like flange.

6. A pipe hanger for use with a composite ring nut, said nut having an outer portion of plastic-like material with a flange on its lower end, and an inner metal nut which fastens onto a pipe hanger rod, and which is positioned in said flange, said nut and said flange having interengaging flat-sided walls which cause the ring nut to move as a unit, comprising:

an elongated metal strap having a lower loop portion for surrounding and supporting a pipe;
the upper ends of said strap being bent towards each other in overlapping relation to form upper and lower segments each having a hole therethrough for insertion of a tubular portion of said composite ring nut;
a depending flange on the end of the lower segment having a flat surface to engage the side of the nut, the lower portion of said strap acting as a spring to urge the segments apart forcing the strap flange into contact with the flange on said composite ring nut, and in the absence of said plastic-like flange to force the hanger flange flat side into contact with the metal nut so as to inhibit inadvertent loosening of the metal nut.

7. The assembly of claim 6 wherein said holes are of sufficient size to allow the hanger flange to engage the metal nut, and yet smaller than the metal nut so that the metal nut supports the strap even in the absence of the composite nut flange.

* * * * *